US012540846B2

(12) United States Patent
He et al.

(10) Patent No.: US 12,540,846 B2
(45) Date of Patent: Feb. 3, 2026

(54) TESTING METHOD AND TESTING SYSTEM FOR HALO OF DISPLAY PANEL (71) Applicant: HKC CORPORATION LIMITED, Shenzhen (CN)

(72) Inventors: Yang He, Shenzhen (CN); Junfeng Xie, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 112 days.

(21) Appl. No.: 18/680,264

(22) Filed: May 31, 2024

(65) Prior Publication Data

US 2025/0012628 A1  Jan. 9, 2025

(30) Foreign Application Priority Data

Jul. 5, 2023 (CN) .......................... 202310813590.9

(51) Int. Cl.
*G01J 1/42* (2006.01)
*G09G 3/20* (2006.01)

(52) U.S. Cl.
CPC .............. *G01J 1/42* (2013.01); *G09G 3/2007* (2013.01); *G01J 2001/4252* (2013.01); *G09G 2320/0233* (2013.01); *G09G 2320/0686* (2013.01)

(58) Field of Classification Search
CPC .. G01J 1/42; G01J 2001/4252; G09G 3/2007; G09G 2320/0233; G09G 2320/0686; G09G 3/006; G02F 1/1309
See application file for complete search history.

(56) References Cited

U.S. PATENT DOCUMENTS

| 2010/0289833 | A1 | 11/2010 | Budzelaar et al. |
| 2012/0007896 | A1 | 1/2012 | Kwon et al. |
| 2013/0265337 | A1 | 10/2013 | Furumoto et al. |
| 2014/0333593 | A1* | 11/2014 | Nagashima .......... G09G 3/3426 345/207 |
| 2015/0325177 | A1* | 11/2015 | Takanashi ................ G09G 3/36 345/697 |

FOREIGN PATENT DOCUMENTS

| CN | 114235150 A | 3/2022 |
| JP | 2003207417 A | 7/2003 |

OTHER PUBLICATIONS

Chinese First Office Action, Chinese Application No. 202310813590. 9, mailed Aug. 11, 2023 (10 pages).
Chinese Notification to Grant Patent Right for Invention, Chinese Application No. 202310813590.9, mailed Aug. 28, 2023 (5 pages).

* cited by examiner

*Primary Examiner* — Tony Ko (57) ABSTRACT

A testing method halo of a display panel and a testing system for halo of a display panel are provided by the present disclosure. The testing method halo of the display panel includes: obtaining a brightness value of a first position point located in a region where the test picture is located; obtaining a brightness value of a second position point located on a loop line surrounding the test picture; obtaining a brightness value of a third position point located in a corner region of the display panel; and obtaining a halo value based on the brightness value of the first position point, the brightness value of the second position point, and the brightness value of the third position point.

20 Claims, 5 Drawing Sheets

TESTING METHOD AND TESTING SYSTEM FOR HALO OF DISPLAY PANEL

CROSS REFERENCE TO RELATED APPLICATIONS

The present disclosure claims priority of Chinese Patent Application No. 202310813590.9, filed on Jul. 5, 2023 in China National Intellectual Property Administration, the entire contents of which are hereby incorporated by reference in their entireties.

TECHNICAL FIELD

The present disclosure relates to the field of display technologies, in particular to a testing method for halo of a display panel and a testing system for halo of a display panel.

BACKGROUND

Local dimming control has become an excellent technology for a display backlighting system, and is widely favored by consumers due to low power consumption and high contrast thereof. However, there are currently some problems with the backlighting control, such as a halo problem in a local dimming panel, which mainly exist in a black region around a bright object. Due to a diffusion property of backlight, leakage decreases with a distance from the bright object.

So far, there is no specific method proposed to evaluate a halo phenomenon. Therefore, how to evaluate the quality of the halo is of great significance for the judgment and improvement of a display quality.

SUMMARY OF THE DISCLOSURE

According to a first aspect of the present disclosure, a testing method for halo of a display panel is provided. The display panel includes a plurality of rectangular display sections arranged in an array. The testing method including: displaying a test picture, and a center position of the test picture coinciding with a center position of the display panel; obtaining a brightness value of a first position point located in a region where the test picture is located; obtaining a brightness value of a second position point located on a loop line surrounding the test picture; where the region surrounded by the loop line and the display section are in a similar shape, a similarity ratio between the region surrounded by the loop line and the display section is a first preset value, and a length direction of the region surrounded by the loop line is the same as a length direction of the display section; obtaining a brightness value of a third position point located in a corner region of the display panel; and obtaining, based on the brightness value of the first position point, the brightness value of the second position point, and the brightness value of the third position point, a plurality of halo values under test pictures with different sizes, and determining a maximum halo value.

According to a second aspect of the present disclosure, a testing system for halo of a display panel is provided, and the testing system includes: an optical testing instrument, configured to calculate brightness values of various position points on the display panel; and a main controller, configured to implement the above-mentioned testing method.

BRIEF DESCRIPTION OF THE DRAWINGS

In order to more clearly illustrate technical solutions in embodiments of the disclosure, a brief description of the drawings required in the description of the embodiments will be given below. Obviously, the drawings described below are only some embodiments of the present disclosure, and other drawings can be obtained by those skilled in the art according to these drawings without any creative work.

Reference numbers in the drawings: 100, display pane; 10, test picture; 20, loop line; 30, symmetry axis; 40, corner region; A, first position point; B, second position point; C, third position point; a, unit length; b, unit width; k, second preset value, Zone, backlight section; 200, testing system of halo of display panel; 201, optical testing instrument; 202, main controller.

DETAILED DESCRIPTIONS

The technical solutions of the embodiments of the present disclosure will be described in detail below in conjunction with the accompanying drawings.

In the following description, for purposes of illustration rather than limitation, specific details, such as specific system architectures, interfaces, and techniques, are set forth in order to provide a thorough understanding of the present disclosure.

The following will clearly and completely describe the technical solutions in the embodiments of the present disclosure in conjunction with the accompanying drawings in the embodiments of the present disclosure. Obviously, the described embodiments are only part of the embodiments of the present disclosure, not all of them. Based on the embodiments of the present disclosure, all other embodiments acquired by those skilled in the art without creative work shall fall within the scope of protection in the present disclosure.

The terms "first", "second", and "third" in the present disclosure are used for descriptive purposes only, and cannot be understood as indicating or implying relative importance or implicitly specifying the quantity of indicated technical features. Thus, features defined as "first", "second", and "third" may explicitly or implicitly include at least one of these features. In the description of the present disclosure, "a plurality of" means at least two, such as two, three, etc., unless otherwise specifically defined. All directional indications (such as up, down, left, right, front, back . . . ) in the embodiments of the present disclosure are only used to explain the relative positional relationships, movements, etc., of components in a certain posture (as shown in the figure), and if the specific posture is changed, the directional indications are also changed accordingly. Furthermore, the terms "include", "have", and any variations thereof, are intended to cover a non-exclusive inclusion. For example, a process, method, system, product, or device including a series of operations or units is not limited to the listed operations or units, but optionally also includes unlisted operations or units, or optionally further includes other operations or units inherent in the process, method, product, or device.

Reference to "embodiment" in the present disclosure means that, specific features, structures, or characteristics described in conjunction with the embodiments may be included in at least one embodiment of the present disclosure. The presence of the phrase at each location in the specification does not necessarily refer to the same embodiment, nor is it a separate or alternative embodiment that is mutually exclusive with other embodiments. It is understood, both explicitly and implicitly, by those skilled in the art that embodiments described herein may be combined with other embodiments.

Figure 1:
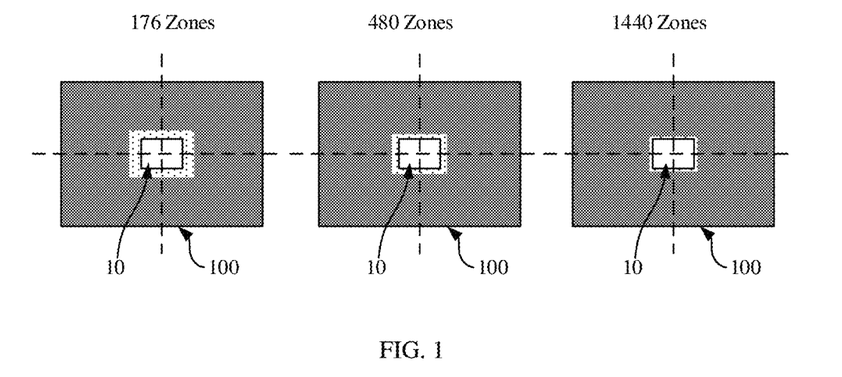
FIG. 1 is a structural schematic view of a display panel and a halo according to some embodiments of the related art.

As shown in FIG. 1, FIG. 1 is a structural schematic view of a display panel and a halo according to some embodiments of the related art.

After research, the present inventors find that an existing evaluation method for a halo does not consider an impact of a size of a backlight section Zone on a testing result. The number of backlight section Zones affects a size of the backlight section Zone. The more backlight section Zones there are in a same display panel 100, the smaller the size of the backlight section Zone. The smaller the size of the backlight section Zone, the slighter the halo, resulting in an error in evaluating the halo of the display panel 100 with different numbers of backlight section Zones. That is to say, a calculated halo value may be very small, however, an actual optical image quality of the display panel 100 is very poor.

Figure 2:
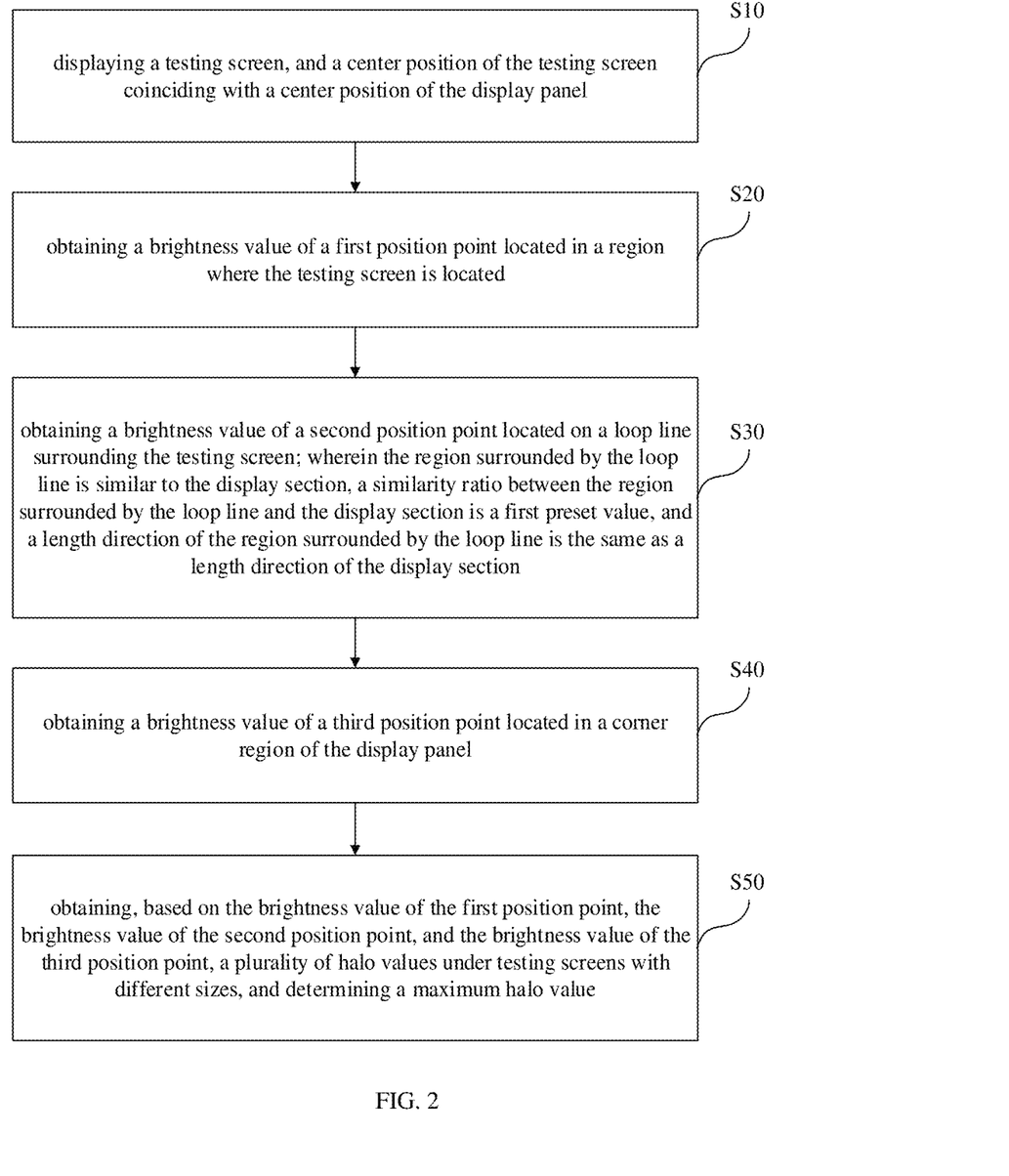
FIG. 2 is a flow chart of a testing method for halo of a display panel according to some embodiments of the present disclosure.

As shown in FIG. 1 and FIG. 2, FIG. 2 is a flow chart of a testing method for halo of a display panel according to some embodiments of the present disclosure.

Therefore, in order to solve the above technical problem, a testing method for halo of a display panel is provided by some embodiments of the present disclosure. The testing method of halo of the display panel the present disclosure is applied to test the halo of the display panel 100. The display panel 100 may be a liquid crystal display (LCD) panel or a self-luminous display panel. The self-luminous display panel may be a light emitting diode (LED) or an organic light emitting diode (OLED). The display panel 100 includes a plurality of rectangular display sections arranged in an array (not shown).

In the embodiment, the LCD panel may be taken as an example. The display sections of the display panel 100 and backlight sections (not shown) of the backlight module (not shown) are arranged in a one-to-one correspondence. The testing method for halo of the display panel includes the following operations.

Figure 3:
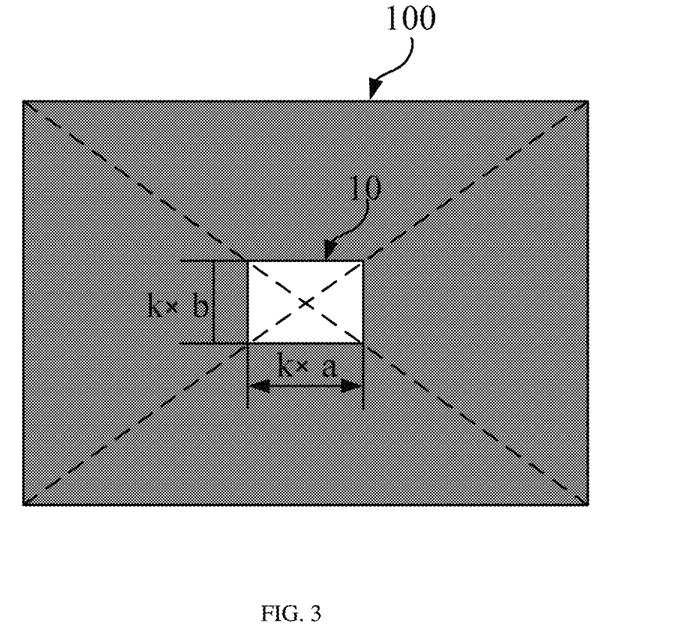
FIG. 3 is a structural schematic view corresponding to an operation S10 in FIG. 2.

As shown in FIG. 3, FIG. 3 is a structural schematic view corresponding to an operation S10 in FIG. 2.

In the operation S10, a test picture is displayed. A center position of the test picture coincides with a center position of the display panel.

Figure 4:
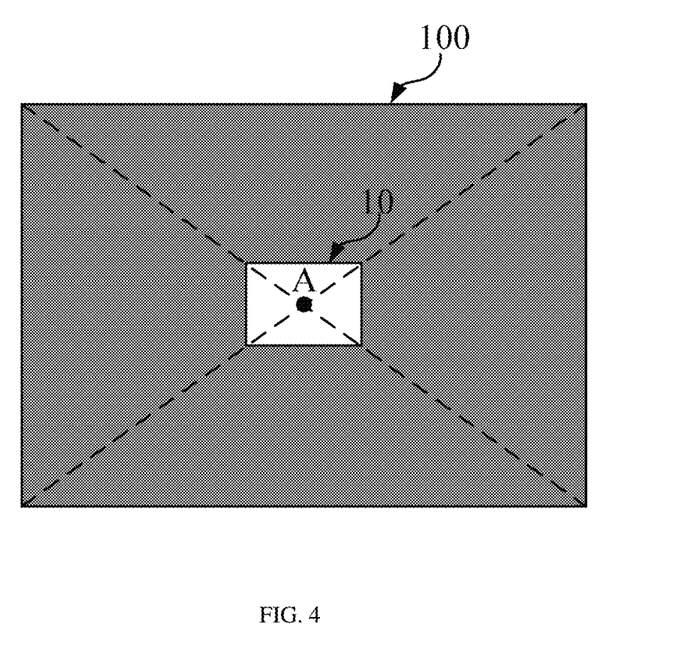
FIG. 4 is a structural schematic view corresponding to an operation S20 in FIG. 2.

In some embodiments, a display panel 100 is controlled to display a test picture 10. A center position of the test picture 10 coincides with a center position of the display panel 100. The center position of the display panel 100 is an intersection of two diagonal lines in a rectangular region where a display screen of the display panel 100 is located. The center position of the test picture 10 coincides with the center position of the display panel 100, so as to ensure that a brightness value of the center position of the test picture 10 is a maximum value, thereby facilitating a subsequent selection of a first position point A (as shown in FIG. 4).

In some embodiments, a white picture is displayed. That is, the test picture 10 displayed on the display panel 100 is a white picture. It should be understood that a display region where the test picture 10 is not displayed displays a black picture. A halo region is formed by a boundary between the white picture and the black picture. The halo region is located in the black picture. That is to say, the test picture 10 in some embodiments of the present disclosure does not include the halo region around the white picture.

A length of the display section may be defined as a unit length a, and a width of the display section may be defined as a unit width b. The unit length a is greater than or equal to the unit width b. When the unit length a is greater than the unit width b, the display section is in the shape of a rectangle. When the unit length a is equal to the unit width b, the display section is in the shape of a square.

The white picture and the display section are in a similar shape, and a similarity ratio between the white picture and the display section is a second preset value k. A length direction of the white picture is the same as that of the display section. That is to say, the white picture is in the shape of a rectangle, and the intersection of the two diagonals of a rectangular region where the white picture is located is the center position of the test picture 10. A length of the white picture is k times the unit length a, and a width of the white picture is k times the unit width b. That is, the length of the test picture 10 is k×a, and the width of the test picture 10 is k×b.

Figure 6:
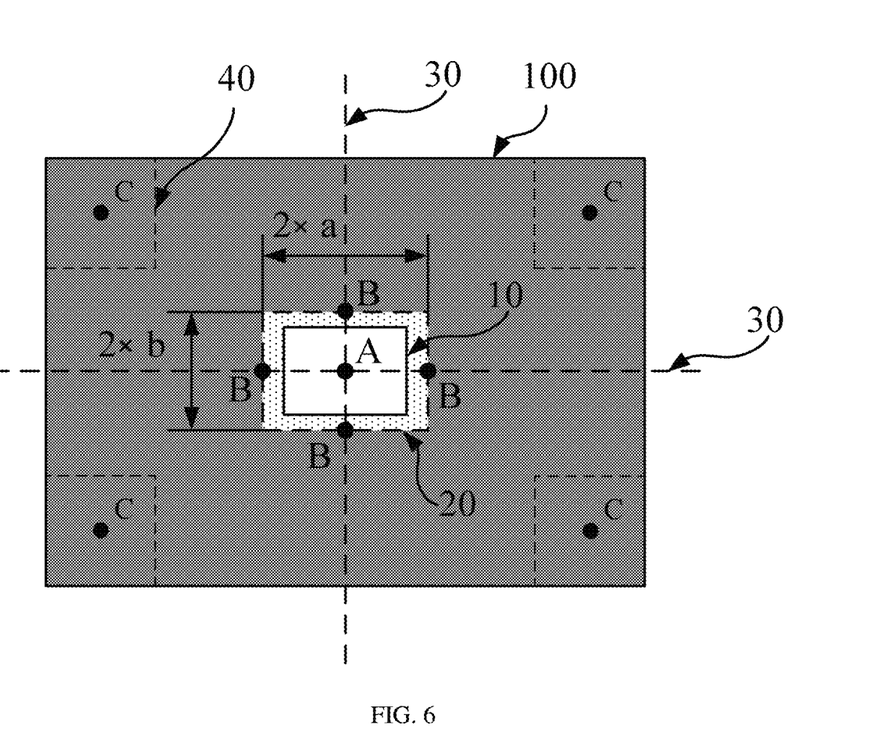
FIG. 6 is a structural schematic view corresponding to an operation S40 in FIG. 2.

The second preset value k is greater than or equal to 1, and less than 2, i.e., 1≤k<2, and k may be equal to 1, 1.2, 1.5, 1.7, and 2, etc. Whether the second preset value k is too large or too small may affect a measurement result of the halo value. The second preset value k is too small, and the size of the test picture 10 is smaller, which is not conducive to a probe of an optical testing instrument measuring brightness of the first position point A selected in a region where the test picture 10 is located. Besides, a size of the test picture 10 is smaller than that of one display section, resulting in the size of the test picture 10 not being associated with sizes of a plurality of display sections, thereby affecting the measurement result of the halo value. If the second preset value k is too large, the larger the size of the test picture 10, and the larger the halo region of the test picture 10, which may affect brightness of the black picture displayed in a corner region 40 (as shown in FIG. 6), thereby affecting the testing result of the halo value.

In some embodiments, the white picture is displayed with a preset gray scale value. The preset grayscale value is 255-level grayscale. The white picture displayed in the 255-level grayscale is a pure white picture, such that it is more conducive to reducing an error of the halo testing result, thereby making a halo value obtained in a subsequent test more accurate and better evaluating an optical image quality of the display panel 100 based on the halo value.

As shown in FIG. 4, FIG. 4 is a structural schematic view corresponding to an operation S20 in FIG. 2.

In the operation S20, a brightness value of the first point located in the region where the test picture is located is obtained.

In some embodiments, the first position point A is selected in the region where the test picture 10 is located, and the brightness value of the first position point A is obtained.

The number of the first position points A may be one or more, as long as it may ensure that the brightness value of the last selected first position point A is the maximum value, thereby ensuring accuracy of the measurement result of the halo value.

In some embodiments, the center position of the test picture 10 is selected as the first position point A, and the brightness value of the first position point A is obtained. That is, in some embodiments, there is one first position point A. It should be understood that the brightness value of the center position of the test picture 10 is the maximum value, and the center position of the test picture 10 is selected as the first position point A, such that it may reduce the number of times to calculate the brightness value of the first position point A, thereby simplifying the operation.

Figure 5:
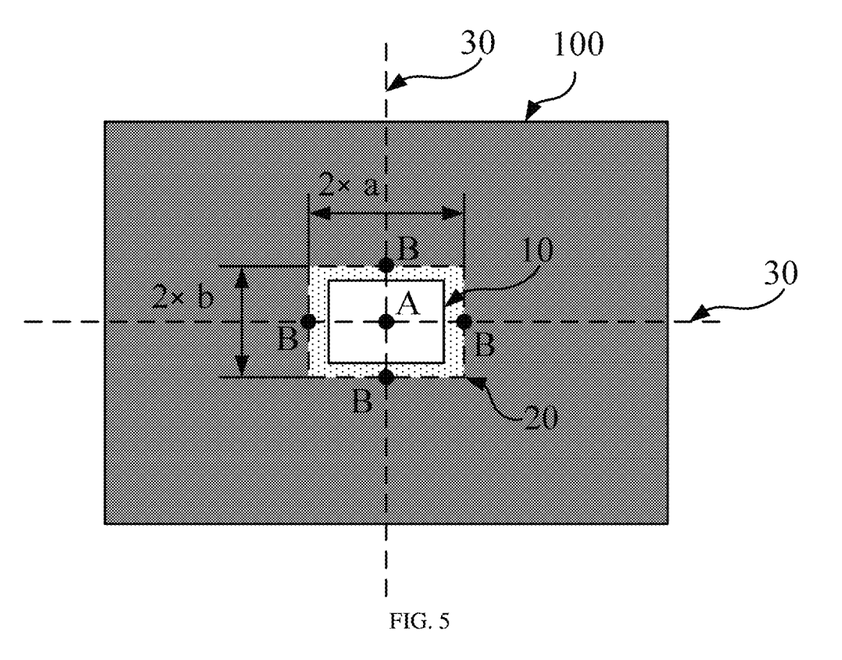
FIG. 5 is a structural schematic view corresponding to an operation S30 in FIG. 2.

As shown in FIG. 5, FIG. 5 is a structural schematic view corresponding to an operation S30 in FIG. 2.

In the operation S30, a brightness value of a second position point located on a loop line surrounding the test picture is obtained. The region surrounded by the loop line and the display section are in a similar shape, and a similarity ratio between the region surrounded by the loop line and the display section is a first preset value. A length direction of the region surrounded by the loop line is the same as a length direction of the display section.

In some embodiments, the loop line 20 surrounding the test picture 10 is selected, the second position point B located on the loop line 20 is selected, and the brightness value of the second position point B is obtained. A center position of the loop line 20 coincides with the center position of the test picture 10. The number of second position points B is at least one. The region surrounded by the loop line 20 and the display section are in a similar shape, and a similarity ratio between the region surrounded by the loop line 20 and the display section is the first preset value. The length direction of the region surrounded by the loop line 20 is the same as the length direction of the display section. That is to say, the loop line 20 is in the shape of a rectangular box. A length of the loop line 20 is twice the unit length a, and a width of the loop line 20 is twice the unit width b. That is, the length of the loop line 20 is 2×a, and the width of the loop line 20 is 2×b.

The first preset value is 2, so as to ensure that the second position point B is still located within the halo region of the test picture 10 when the size of the test picture 10 changes, and thus it does not affect the reliability of the testing result of the halo value, and may reduce the measurement operation.

It should be understood that the first preset value may also be other values, but it is necessary to change the first preset value several times to select a plurality of loop lines 20, such that the number of second position points B to be selected increases, resulting in increasing the measurement operation.

In some embodiments, one second position B is selected from four side edges of the test picture 10, respectively. Each of two second position points B located on a short side of the test picture 10 is on a symmetry axis 30 of the short side of the test picture 10. Each of two second position points B located on a long side of the test picture 10 is on a symmetry axis 30 of the long side of the test picture 10. That is to say, an intersection of a connecting line between two second position points B disposed on opposite sides in the length direction of the test picture 10 and a connecting line between two second position points B disposed on opposite sides in the width direction of the test picture 10 is the center position of the test picture 10. In some embodiments, each of the four second position points B selected is a point closest to the center position point of the test picture 10 in the length direction or the width direction of the test picture 10, such that the brightness value of each of the four second position points B is larger than those of other position points on the loop line 20, and is able to better represent the brightness value of the halo region, thereby reducing the error of the testing result of the halo value. In addition, in the embodiments, the number of times to calculate the brightness value of the second position point B may also be reduced, thereby simplifying the operation.

As shown in FIG. 6, FIG. 6 is a structural schematic view corresponding to an operation S40 in FIG. 2.

In the operation S40, a brightness value of a third position point located in the corner region of the display panel is obtained.

In some embodiments, the corner region 40 of the display panel 100 is determined, the third position point C is selected in the corner region 40, and the brightness value of the third position point C is obtained.

In some embodiments, the corner region 40 is located at an intersection of a long side and a short side of the rectangle. The corner region 40 is in the shape of a rectangle. The number of corner regions 40 is four, and an area of a single corner region 40 is 1/10 of an entire display area of the display panel 100. It should be understood that the corner region 40 is a region farthest from the test picture 10 in the display region of the display panel 100. An area design of the corner region 40 may ensure that a screen located within the corner region 40 is a pure black picture when the size of the display panel 100 and the number of the display sections of the display panel 100 change, without affecting the accuracy of the testing result. The area of the corner region 40 is too small, such that it is not conducive to the optical testing instrument measuring the brightness of the third position point A located within the corner region 40. The area of the corner region 40 is too large, a distance between the corner region 40 and the test picture 10 may be reduced, which causes the halo of the test picture 10 to affect the brightness of the pure black picture located within the corner region 40, thereby affecting the testing result of the halo value. The number of the third point C located within the single corner region 40 may be one or more.

In some embodiments, one third position point C is arranged in each of the four corner regions 40 of the display panel 100. The center position of the corner region 40 of the display panel 100 may be selected as the third position point C, and the brightness value of the third position point C may be obtained. The corner region 40 is disposed in a positive direction, facilitating the optical testing instrument to locate the third position point C.

It should be noted that a selection order of the first position point A, the second position point B, and the third position point C may be any order, which is not limited herein. The third position point C may be selected first, or the second position point B may be selected first, which may be selected according to actual needs.

In an operation S50, based on the brightness value of the first position point, the brightness value of the second position point, and the brightness value of the third position point, the halo value under different sizes of the test picture is obtained, and the maximum halo value is determined.

In some embodiments, based on the brightness value of the first position point A, the brightness value of the second position point B, and the brightness value of the third position point, C a plurality of halo values under test pictures 10 with different sizes is obtained, and the maximum halo value is determined.

That is to say, on a certain size of the test picture 10, the halo value is calculated based on the brightness value of the first position point A, the brightness value of the second position point B, and the brightness value of the third position point C. The test picture 10 with different sizes may be selected, the plurality of halo values is obtained, and the maximum halo value is selected as a final halo value of the display panel 100.

It should be noted that under 10 test pictures of the same size, since the first position point A, the second position point B and the third position point C can all be multiple, multiple halo values can be obtained under 10 test pictures of the same size, and the halo values of test pictures of different sizes can be compared. The maximum halo value is selected as the final halo value of the display panel 100.

A calculation formula of the halo value is shown as follows.

$$H = \frac{|L_B - L_C|}{L_A} \times 100\%$$

where H represents the halo value, $L_A$ represents the brightness value of the first position point A, $L_B$ represents the brightness value of the second position point B, and $L_C$ represents the brightness value of the third position point C.

The testing method for halo of the display panel is provided by some embodiments of the present disclosure. The display panel 100 includes the plurality of rectangular display sections arranged in an array. The testing method of halo of the display panel includes: displaying the test picture 10, where the center position of the test picture 10 coincides with the center position of the display panel 100; obtaining the brightness value of the first position point A located in a region where the test picture 10 is located; obtaining the brightness value of the second position point B located on the loop line 20 surrounding the test picture 10, where the region surrounded by the loop line 20 and the display section are in a similar shape, the similarity ratio between the region surrounded by the loop line 20 and the display section is the first preset value, and the length direction of the region surrounded by the loop line 20 is the same as the length direction of the display section; obtaining the brightness value of the third position point C located in the corner region 40 of the display panel 100; obtaining, based on the brightness value of the first position point A, the brightness value of the second position point B, and the brightness value of the third position point C, the plurality of halo values under test pictures 10 with different sizes, and determining the maximum halo value. In the embodiments of the present disclosure, the size of the test picture 10 is associated with the size of the display section, and the first position point A is selected in the test picture 10. The second position point B is selected by referring to the size of the display section and the center position of the test picture 10, the third position point is selected, and the halo value is calculated according to the brightness value of the first position point A, the brightness value of the second position point B, and the brightness value of the third position point. In this way, it may exclude the influence of the size of the display section on the halo, the accuracy of the halo value obtained from testing is improved, which may better evaluate the optical image quality of the display panel 100 based on the halo value.

Figure 7:
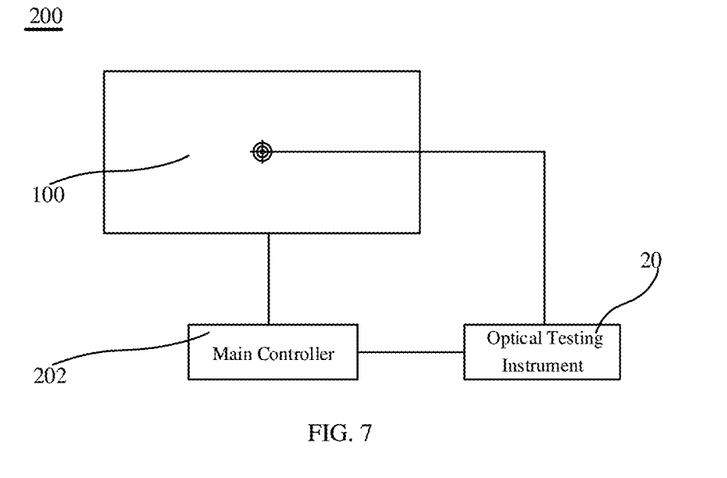
FIG. 7 is a modular schematic view of a testing system for halo of a display panel according to some embodiments of the present disclosure.

As shown in FIG. 7, FIG. 7 is a modular schematic view of a testing system for halo of a display panel according to some embodiments of the present disclosure.

A testing system 200 for halo of the display panel is provided by some embodiments of the present disclosure. The testing system 200 for the displaying panel halo includes an optical testing instrument 201 and a main controller 202. The optical testing instrument 201 is configured to calculate brightness values of various position points on the display panel 100. The main controller 202 is configured to implement the above-mentioned testing method of halo of the display panel.

The optical testing instrument 201 is aligned with a designated position point on the display panel 100, such as the first position point, the second position point, and the third position point, so as to obtain the brightness value of the first position point, the brightness value of the second position point, and the brightness value of the third position point.

The above illustrates only the embodiments of the disclosure, and does not limit the protection scope of the present disclosure. Any equivalent structure or equivalent process conversion made by using the description and drawings of the present disclosure, or directly or indirectly used in other related technical fields, are all included in the protection scope of the present disclosure in the same way.

In some embodiments, the optical testing instrument 201 may be a two-dimensional brightness imager. The two-dimensional brightness imager may at least include: an optical system, a photosensitive element, and an image data processing module. The optical system is configured to focus an image of light source to be tested onto the photosensitive element, and may include at least one lens. The photosensitive element may be a charge coupled device (CCD) or a complementary metal oxide semiconductor (CMOS) sensor, and may be configured to convert a light signal into an electrical signal. The image data processing module is configured to convert the electrical signal output by the photosensitive element into digital image data, and process and analyze the digital image data through a built-in software to calculate measurement results of parameters such as a brightness value, a chromaticity value, etc. In some embodiments, the two-dimensional brightness imager may be an imaging color brightness meter, or a two-dimensional imaging chromaticity meter.

According to a first aspect of the present disclosure, a testing method for halo of a display panel is provided. The display panel includes a plurality of rectangular display sections arranged in an array. The testing method including: displaying a test picture, and a center position of the test picture coinciding with a center position of the display panel; obtaining a brightness value of a first position point located in a region where the test picture is located; obtaining a brightness value of a second position point located on a loop line surrounding the test picture; where the region surrounded by the loop line and the display section are in a similar shape, a similarity ratio between the region surrounded by the loop line and the display section is a first preset value, and a length direction of the region surrounded by the loop line is the same as a length direction of the display section; obtaining a brightness value of a third position point located in a corner region of the display panel; and obtaining, based on the brightness value of the first position point, the brightness value of the second position point, and the brightness value of the third position point, a plurality of halo values under test pictures with different sizes, and determining a maximum halo value.

In some embodiments, the displaying a test picture, includes: displaying a white picture; where the white picture and the display section are in a similar shape, and a similarity ratio between the white picture and the display section is a second preset value; and a length direction of the white picture is the same as the length direction of the display section.

In some embodiments, the second preset value is greater than or equal to 1, and less than 2.

In some embodiments, the displaying a white picture, includes: displaying the white picture with a preset grayscale value; where the preset grayscale value is 255-level grayscale.

In some embodiments, an intersection of two diagonals of a rectangular region where the white picture is located is the center position of the test picture.

In some embodiments, the obtaining a brightness value of a first position point located in a region where the test picture is located, includes: selecting the center position of the test picture as the first position point, and obtaining the brightness value of the first position point.

In some embodiments, each of four corner regions of the display panel is arranged with one third position point; and the obtaining a brightness value of a third position point located in a corner region of the display panel, includes: selecting a center position of the corner region of the display panel as the third position point, and obtaining the brightness value of the third position point.

In some embodiments, the corner region is in the shape of a rectangle, and an area of a single corner region is $\frac{1}{10}$ of an entire display area of the display panel.

In some embodiments, the first preset value is 2; and the obtaining a brightness value of a second position point located on a loop line surrounding the test picture, includes: selecting four second position points from four side edges of the test picture, respectively; where each of two second position points located on a short side of the test picture is on a symmetry axis of the short side of the test picture, and each of two second position points located on a long side of the test picture is on a symmetry axis of the long side of the test picture.

In some embodiments, an intersection of a connecting line between two second position points disposed on opposite sides in the length direction of the test picture and a connecting line between two second position points disposed on opposite sides in the width direction of the test picture is the center position of the test picture.

In some embodiments, each of the four second position points selected is a point closest to the center position point of the test picture in the length direction or the width direction of the test picture.

In some embodiments, a calculation formula of the halo value is:

$$H = \frac{|L_B - L_C|}{L_A} \times 100\%,$$

where H represents the halo value, $L_A$ represents the brightness value of the first position point, $L_B$ represents the brightness value of the second position point, and $L_C$ represents the brightness value of the third position point.

In some embodiments, the center position of the display panel is an intersection of two diagonal lines in a rectangular region where a display screen of the display panel is located.

In some embodiments, a center position of the loop line coincides with the center position of the test picture.

In some embodiments, the corner region is located at an intersection of a long side and a short side of the rectangle.

In some embodiments, the corner region is a region farthest from the test picture in the display region of the display panel According to a second aspect of the present disclosure, a testing system for halo of a display panel is provided, and the testing system includes: an optical testing instrument, configured to calculate brightness values of various position points on the display panel; and a main controller, configured to implement the above-mentioned testing method.

What is claimed is:

1. A testing method for halo of a display panel, the display panel comprising a plurality of rectangular display sections arranged in an array, and the testing method comprising:
displaying a test picture, and a center position of the test picture coinciding with a center position of the display panel;
obtaining a brightness value of a first position point located in a region where the test picture is located;
obtaining a brightness value of a second position point located on a loop line surrounding the test picture; wherein the region surrounded by the loop line and the display section are in a similar shape, a similarity ratio between the region surrounded by the loop line and the display section is a first preset value, and a length direction of the region surrounded by the loop line is the same as a length direction of the display section;
obtaining a brightness value of a third position point located in a corner region of the display panel; and
obtaining, based on the brightness value of the first position point, the brightness value of the second position point, and the brightness value of the third position point, a plurality of halo values under test pictures with different sizes, and determining a maximum halo value.

2. The testing method according to claim 1, wherein the displaying a test picture, comprises:
displaying a white picture;
wherein the white picture and the display section are in a similar shape, and a similarity ratio between the white picture and the display section is a second preset value; and
a length direction of the white picture is the same as the length direction of the display section.

3. The testing method according to claim 2, wherein the second preset value is greater than or equal to 1, and less than 2.

4. The testing method according to claim 2, wherein the displaying a white picture, comprises:
displaying the white picture with a preset grayscale value; wherein the preset grayscale value is 255-level grayscale.

5. The testing method according to claim 2, wherein an intersection of two diagonals of a rectangular region where the white picture is located is the center position of the test picture.

6. The testing method according to claim 1, wherein the obtaining a brightness value of a first position point located in a region where the test picture is located, comprises:
selecting the center position of the test picture as the first position point, and obtaining the brightness value of the first position point.

7. The testing method according to claim 1, wherein each of four corner regions of the display panel is arranged with one third position point; and the obtaining a brightness value of a third position point located in a corner region of the display panel, comprises:
selecting a center position of the corner region of the display panel as the third position point, and obtaining the brightness value of the third position point.

8. The testing method according to claim 7, wherein the corner region is in the shape of a rectangle, and an area of a single corner region is 1/10 of an entire display area of the display panel.

9. The testing method according to claim 1, wherein the first preset value is 2; and
the obtaining a brightness value of a second position point located on a loop line surrounding the test picture, comprises:
selecting four second position points from four side edges of the test picture, respectively;
wherein each of two second position points located on a short side of the test picture is on a symmetry axis of the short side of the test picture, and each of two second position points located on a long side of the test picture is on a symmetry axis of the long side of the test picture.

10. The testing method according to claim 9, wherein an intersection of a connecting line between two second position points disposed on opposite sides in the length direction of the test picture and a connecting line between two second position points disposed on opposite sides in the width direction of the test picture is the center position of the test picture.

11. The testing method according to claim 9, wherein each of the four second position points selected is a point closest to the center position point of the test picture in the length direction or the width direction of the test picture.

12. The testing method according to claim 1, wherein a calculation formula of the halo value is:

$$H = \frac{|L_B - L_C|}{L_A} \times 100\%$$

wherein H represents the halo value, $L_A$ represents the brightness value of the first position point, $L_B$ represents the brightness value of the second position point, and $L_C$ represents the brightness value of the third position point.

13. The testing method according to claim 1, wherein the center position of the display panel is an intersection of two diagonal lines in a rectangular region where a display screen of the display panel is located.

14. The testing method according to claim 1, wherein a center position of the loop line coincides with the center position of the test picture.

15. The testing method according to claim 1, wherein the corner region is located at an intersection of a long side and a short side of the rectangle.

16. The testing system for halo of a display panel according to claim 15, wherein the displaying a test picture, comprises:
displaying a white picture;
wherein the white picture and the display section are in a similar shape, and a similarity ratio between the white picture and the display section is a second preset value; and
a length direction of the white picture is the same as the length direction of the display section.

17. The testing system for halo of a display panel according to claim 15, wherein each of four corner regions of the display panel is arranged with one third position point; and
the obtaining a brightness value of a third position point located in a corner region of the display panel, comprises:
selecting a center position of the corner region of the display panel as the third position point, and obtaining the brightness value of the third position point.

18. The testing system for halo of a display panel according to claim 17, wherein the corner region is in the shape of a rectangle, and an area of a single corner region is 1/10 of an entire display area of the display panel.

19. The testing method according to claim 1, wherein the corner region is a region farthest from the test picture in the display region of the display panel.

20. A testing system for halo of a display panel, comprising:
an optical testing instrument, configured to calculate brightness values of various position points on the display panel; and
a main controller, configured to implement a testing method for halo of a display panel;
wherein the display panel comprises a plurality of rectangular display sections arranged in an array, and the testing method comprises:
displaying a test picture, and a center position of the test picture coinciding with a center position of the display panel;
obtaining a brightness value of a first position point located in a region where the test picture is located;
obtaining a brightness value of a second position point located on a loop line surrounding the test picture; wherein the region surrounded by the loop line and the display section are in a similar shape, a similarity ratio between the region surrounded by the loop line and the display section is a first preset value, and a length direction of the region surrounded by the loop line is the same as a length direction of the display section;
obtaining a brightness value of a third position point located in a corner region of the display panel; and
obtaining, based on the brightness value of the first position point, the brightness value of the second position point, and the brightness value of the third position point, a plurality of halo values under test pictures with different sizes, and determining a maximum halo value.

* * * * *